June 20, 1967 J. G. CAERO 3,326,328

SEGMENT ACTUATED DISK BRAKE

Filed Aug. 2, 1965 4 Sheets-Sheet 1

INVENTOR.
JOSE G. CAERO
BY Eugene C. Knoblock
ATTORNEY

INVENTOR.
JOSE G. CAERO
BY Eugene C. Knoblock
ATTORNEY

INVENTOR.
JOSE G. CAERO
BY
Eugene C. Knoblock
ATTORNEY

June 20, 1967 J. G. CAERO 3,326,328

SEGMENT ACTUATED DISK BRAKE

Filed Aug. 2, 1965 4 Sheets-Sheet 4

INVENTOR.
JOSE G. CAERO

BY Eugene C. Knoblock
ATTORNEY

United States Patent Office 3,326,328
Patented June 20, 1967

3,326,328

SEGMENT ACTUATED DISK BRAKE

Jose G. Caero, 4205 Clayton Road W., Fort Worth, Tex. 76116

Filed Aug. 2, 1965, Ser. No. 476,329
8 Claims. (Cl. 188—72)

This invention relates to improvements in disk brakes, and particularly disk brakes of the self-energizing segment actuated type, such as described in my Patent No. 3,185,257, dated May 25, 1965.

The primary object of this invention is to provide a disk brake which is self-energizing in forward and reverse vehicle operation and which is characterized by smooth operation, efficiency and simplicity of construction.

A further object is to provide a brake of this character having two braking disk assemblies and a novel swivel actuating means characterized by at least two disk assembly segments opposed to each other and operable independently of the remainder of the respective associated disk assemblies to initiate actuation of the latter.

A further object is to provide a self-energizing disk brake having one disk assembly which is axially shiftable in a torque plate, and a second disk assembly of floating character capable of both axial movement and limited circumferential movement, wherein said first named disk assembly transfers the brake load to a torque plate and operates to eliminate any objectionable clocking action of the brake due to anchoring loads.

A further object is to provide a disk brake in which the anchoring load is taken at more than one place in a manner to eliminate brake chatter or noise, as sometimes occurs when a reaction point is located at a distance from the origin of the load.

A further object is to provide a disk brake with novel means for adjusting the brake disks to effect clearance with the cooperating brake drum surfaces.

Other objects will be apparent from the following specification.

Figure 1:
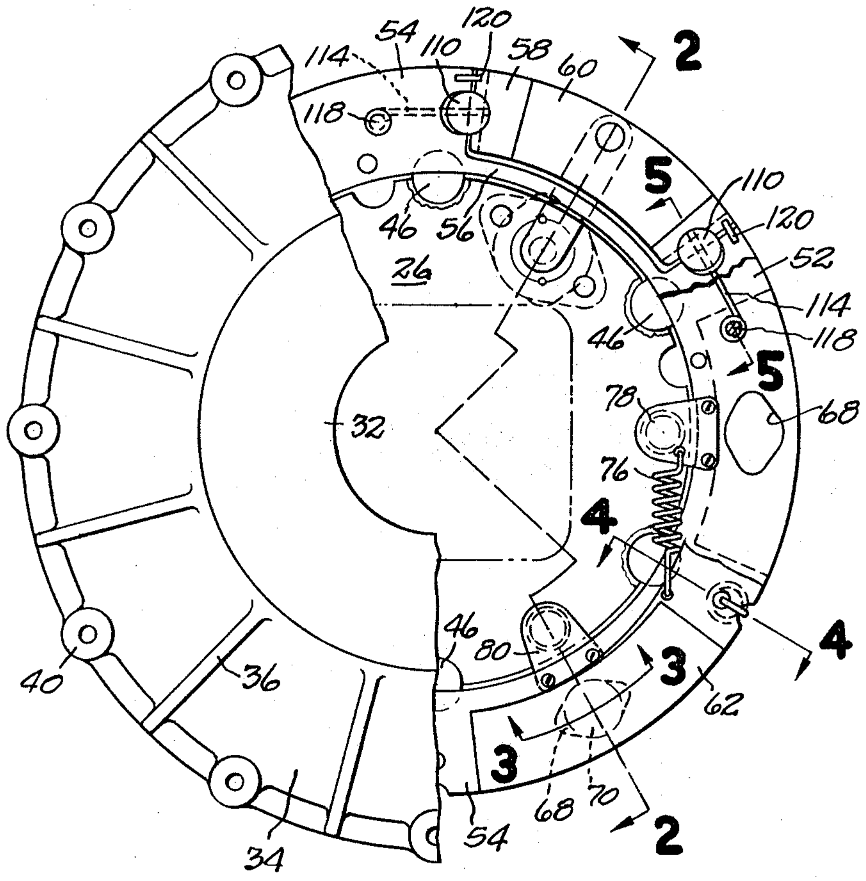
FIG. 1 is an outboard face view of my improved brake with the outboard face plate partially broken away to expose a portion of the internal brake disk assembly construction and related parts.

Referring to the drawings, and particularly to FIGS. 1 to 8, which illustrate one embodiment of the invention which may be applied to a brake on a front or steering wheel of a vehicle and which is also applicable with equal facility to the rear or non-steering wheels of a vehicle, the numeral 20 designates a spindle carrier of a conventional character adapted to be mounted pivotally upon the front axle (not shown) of a motor vehicle. A wheel hub 22 is suitably journaled upon a spindle mounted on the spindle carrier 20 by suitable bearing and retainer means (not shown) of a construction well understood in the art.

The spindle carrier 20 has fixedly secured thereto a plurality of spaced bolts 24. Bolts 24 serve as means to mount a torque plate 26 upon the spindle carrier 20. The spindle carrier 20 may also mount a dust shield 28 which preferably terminates in a cylindrical peripheral flange portion 30.

The outboard part 32 of a brake drum is secured to the wheel hub 22 by suitable securing members (not shown). Drum part 32 includes an inwardly offset annular portion 34 whose inner surface constitutes a frictional or braking surface. Ribs or fins 36 preferably extend from part 34 for cooling purposes. At its outer margin the outboard brake drum part 32 has a substantially cylindrical flange 38 provided with circumferentially spaced projections or lugs 40.

An inboard brake drum part 42 defines a flat annular friction surface spaced from and opposite the inner friction face of part 34 of the outboard drum part, said surfaces preferably being substantially parallel. Part 42 is fixedly secured to part 34 by suitable securing means (not shown) passed through apertures in the projections 40. Adjacent its inner margin the inboard brake drum part 42 may have spaced circumferential flanges 44 which define a groove receiving with rotative clearance the cylindrical flange 20 of the dust shield 28.

At a plurality of circumferentially spaced points adjacent its margin the torque plate 26 carries anchor pins or anchor lugs 46. One part 48 of an annular braking member or shoe has a sliding fit upon the anchor pins 46 accommodating movement of said braking member or shoe in an axial direction toward and from the inboard brake drum part 42. The member 48 or shoe has one or more interruptions and a segmental reaction member 50 is located in each interruption. Each of the parts 48 and 50 is provided with a brake lining 52 engageable with the inner surface of the inboard brake drum part 42.

An outboard annular braking member or shoe 54 confronts the annular outboard drum part 34. Member 54 has an interruption preferably bridged by a narrow part 56 thereof. A segmental reaction member 58 fits in the interruption of the outboard brake shoe 54 and carries a brake lining 60. Brake lining 62 is carried by the brake member 54. The brake linings 60 and 62 are adapted to engage the inner surface of the offset part 34 of the outboard part of the brake drum.

Figures 2, 6, 7, 8:
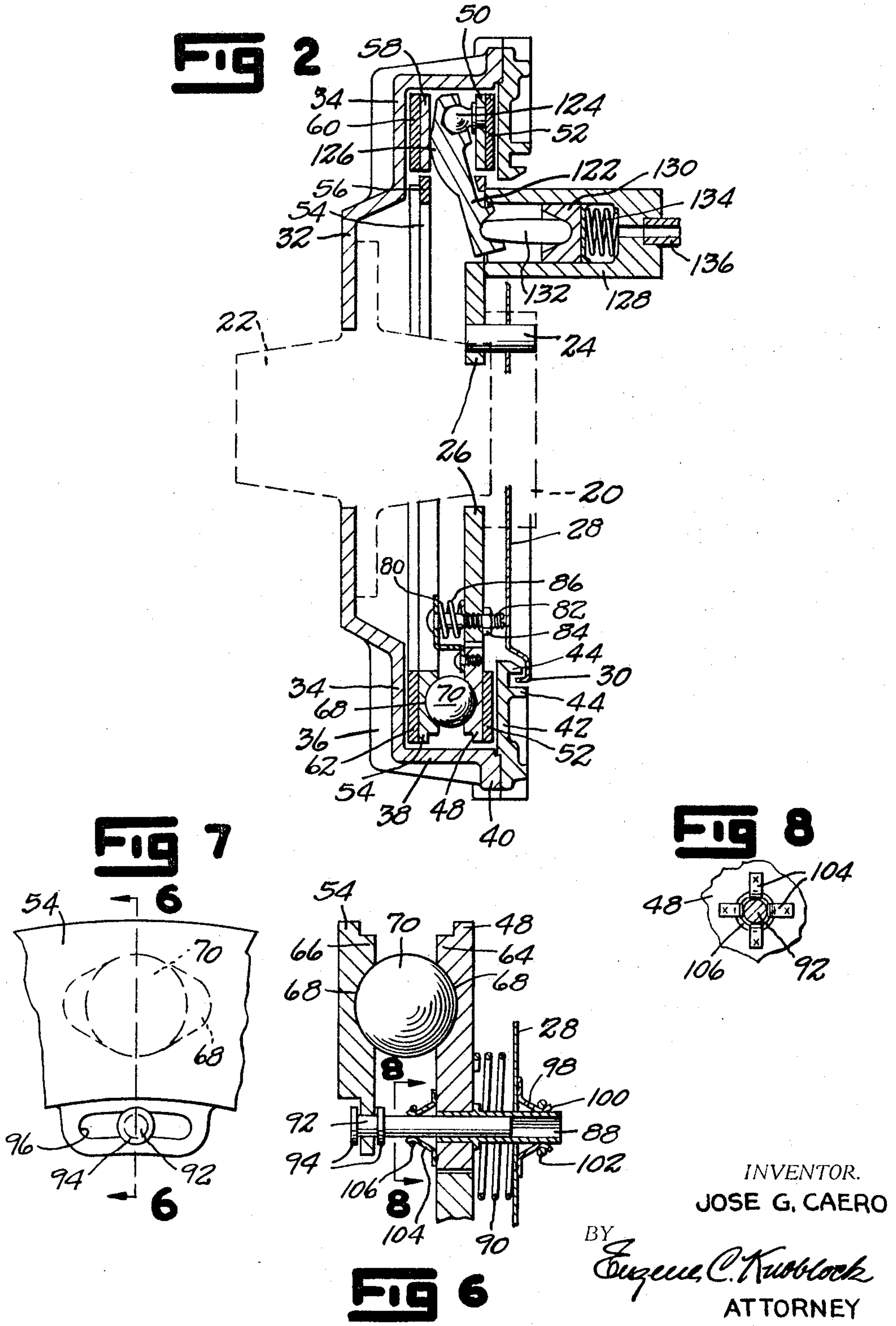
FIG. 2 is a sectional view taken on line 2—2 of FIG. 1.
FIG. 6 is a fragmentary radial transverse sectional view taken on line 6—6 of FIG. 7.
FIG. 7 is a fragmentary face view of a brake disk assembly construction as viewed from the left in FIG. 6.
FIG. 8 is a fragmentary sectional view taken on line 8—8 of FIG. 6.
Figure 3:
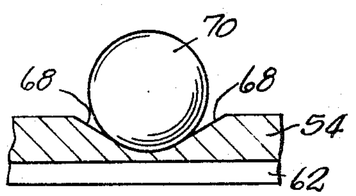
FIG. 3 is a fragmentary sectional view taken on line 3—3 of FIG. 1.

At circumferentially spaced points at the inner faces of the braking members or shoes 48 and 54 are formed thickened portions 64 and 66, respectively, as best seen at FIG. 6, in which thickened portions are formed circumferentially elongated camming recesses 68. The recesses 68 are spaced substantially equally circumferentially and are preferably displaced less than 90 degrees from one another circumferentially, as best seen in FIG. 1. The cam recesses 68 in the shoes 48 and 54 normally register and a sphere 70 or ball is interposed between the two brake shoes and seats in the recesses 68. The arrangement is such that when the recesses 68 are in register and the shoes 48 and 54 contact the ball 70, the brake linings 52, 60 and 62 will have running clearance with the brake drum. However, when the outboard annular brake member 54 is displaced circumferentially relative to the inboard brake membr 48, camming portions of the recesses 68 engaging the ball 70 will separate the braking members to effect frictional braking engagement of the brake linings with the parts 34 and 42 of the brake drum.

Figure 4:
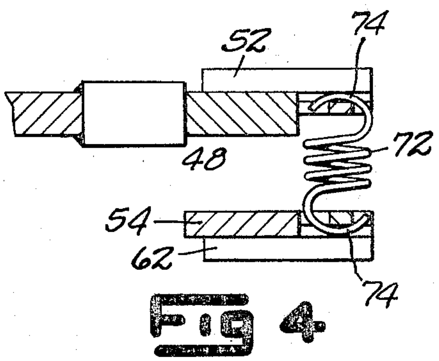
FIG. 4 is a fragmentary transverse sectional view taken on line 4—4 of FIG. 1.

Any suitable means may be provided to urge the members 54 and 48 into firm engagement with the balls 70. One such means is illustrated in FIG. 4 and constitutes a coil spring 72 having hook ends 74 which engage in apertures in the members 48 and 54 at circumferentially spaced points. Thus at circumferentially spaced points substantially uniform pressure is exerted tending to keep the members 54 and 48 coplanar with each other and with the friction surfaces of the brake drum.

A coil spring 76, as shown in FIG. 1, is anchored at one end to the member 54 and at its opposite end to a bracket or anchor member 78 on torque plate 26, or on the inboard brake member 48, to insure seating of the spheres 70 firmly in the recesses 68.

Any siutable means may be provided for adjusting the clearance of the lining 52 of the inboard braking member 48 with the adjacent brake drum surface 42. One such means is illustrated in FIG. 2, wherein an offset bracket 80 carried by the inboard braking member 48 projects radially inwardly therefrom. An adjusting screw 82 is carried by the bracket 80 and extends outwardly therefrom through the torque plate 26 and mounts an adjusting nut 84. A coil spring 86 encircles the screw 82 and bears at its opposite ends against the torque plate 26 and the bracket 80. It will be observed that by adjustment of the nut 84 on the screw 82, the spacing between the bracket 80 and the torque plate 26 is varied as accommodated by compression or expansion of the coil spring 86. It will be understood that brackets 80 and springs 86 and associated adjusting members 82 and 84 are located at circumferentially spaced points relative to the braking member 48.

An alternative construction of an adjustment means is shown in FIGS. 6, 7 and 8. A tubular member 88 extends through aligned openings in the dust shield 28 and the braking member 48 which are separated by a coil spring 90 which encircles the tubular member 88. A pin 92 has a slide fit in the tubular member 88 and projects through an aperture in the opposite braking member 54. Pin 92 has a pair of longitudinally spaced abutments, such as flanges 94, spaced apart a predetermined distance which is greater than the thickness of the part 54 through which the pin 92 passes, as at a circumferentially elongated slot 96. The difference between the thickness of the slotted part 54 and the spacing of the abutments 94 will preferably be equal to the normal clearance desired between the brake lining 62 and the outboard friction drum part 34 in the idle or inoperative position of the brake. The dust shield 28 has a plurality of spring fingers 98 secured thereto spaced from and equally spaced relative to the tube 88 and having inner hook portions 100 in frictional engagement with the periphery of the tube 88 spaced from the dust shield. A resilient ring 102, such as a split spring, encircles the finger hook portions 100 and maintains them in frictional engagement with the tube 88. The arrangement is such that the fingers 98 apply frictional resistance to movement of the tube 88 lengthwise to the left relative to the dust shield greater than frictional resistance applied thereby upon movement of the tube 88 toward the right, as seen in FIG. 6. A similar set of spring fingers 104 is secured to the inner face of the member 48 with their inner hook ends engaging the pin 92 and urged thereagainst by resilient or spring ring 106. The arrangement is such that when the brake is released after a movement greater than is required to normally apply the brake, the extension of the pin 92 in the tube 88 is greater than normal and its retraction upon release of the brake is less, or normal, by reason of the action of the spring fingers 98 and 104. By this means reduction in the thickness of the linings is automatically compensated, and the brake members 48 and 54 are progressively urged apart as required to maintain a desired clearance only of the brake linings with the cooperating brake drum parts.

Figure 5:
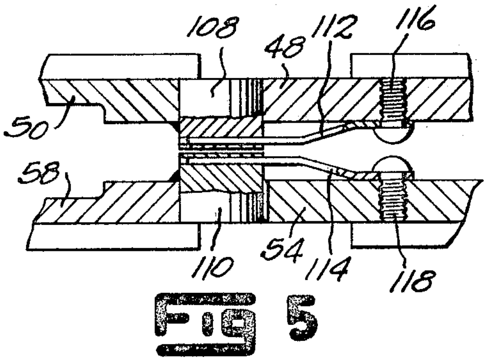
FIG. 5 is a fragmentary transverse sectional view taken on line 5—5 of FIG. 1.

Means are provided in the device for normally maintaining the segmental reaction member 50 in the plane of the braking member 48 and the segmental reaction member 58 in the plane of the braking member 54 when the braking members are inoperative. One such means is illustrated in FIGS. 1 and 5, wherein the adjacent ends of each segment and the cooperating braking member are notched or recessed, and each notch at each end of each segment or of each brake member mounts a pin or flange extending parallel to the axis of the brake, such as a pin 108 on each end of the segment 52 and a pin 110 on each end of the segment 58 as herein shown. The pins or flanges project from the plane of the parts of the respective brake assemblies, and as shown, they terminate spaced apart. At their projecting parts the pins or flanges are provided with holes in which are slidably received, respectively, the ends of elongated spring members 112 and 114. Springs 112 and 114 are secured to the other or unflanged part of each of the braking assemblies 48, 50 and 54, 58, as by securing members 116 and 118. It will be seen that the springs accommodate relative axial movement of the segment and the braking member of each braking assembly, and, further, that springs 114 accommodate circumferential movement of the parts of the floating braking assembly 54, 58 by sliding in the holes of the pins or flanges thereof. Means are preferably provided to limit relative axial movement of the segments with respect to their cooperating braking members in one direction. Such means can preferably constitute stops 120 which are carried by one of the cooperating parts and project in the path of the other operating part, as seen in FIG. 1. It will be noted in FIG. 1 that the notches in the ends of the parts 54 are of sufficient depth to provide clearance for the pins 110.

The brake actuating mechanism constitutes a lever 122 which is pivoted at one end upon the spherical head of a pin 124 carried by segment 50. Lever 122 has a fulcrum part 126 intermediate its length. The lever 122 extends substantially radially and its fulcrum portion 126 is adapted to engage the segment 58. Any suitable means is provided to rock the lever 122 in a manner to cause it to separate the segments 50 and 58. As here shown, the operating means constitutes a hydraulic cylinder 128 having a piston 130 from which projects a piston pin 132 engageable with lever 122. A coil spring 134 urges the piston pin 132 against the lever at all times but the force applied thereby is less than the force applied by the springs 72 to cause the braking members to return to normal or inoperative position. Cylinder 128 has connection with a fluid pressure line 136 connected to a master cylinder (not shown) in a manner well understood in the art and adapted to apply pressure to move the piston with sufficient force to pivot the lever 122 and separate the segments 50 and 58 and cause them to engage the confronting brake drum surfaces.

Upon actuation of the hydraulic or other brake actuating means to cause the segments 50 and 58 to separate and contact the brake drum, the outboard segment 58 abuts one end of the outboard shoe 54, which is a floating shoe in that it is capable of circumferential movement as distinguished from the restraint against circumferential movement applied to the inboard member 48.

Circumferential rotative movement of the floating or outboard shoe assembly thus occurs, and the circumferential displacemnt thereof relative to the opposite member 48 causes the separation of the brake members by reason of the travel of the camming recesses 68 upon the spheres 70. The braking members 48 and 54 remain in substantially parallel position as they are separated so as to exert equal braking force throughout their respective circumferential extents, and so as to prevent tilting or binding which would interfere with free and normal operation of the brake members.

It will be seen that the initial movement of the segments 50 and 58 relative to the associated braking members 48 and 54 is accommodated by flexing of the spring mmebers 112 and 114. These spring members also have a tendency to transmit from the associated braking members 48 and 54 to the segments 50 and 58 the axial return or release movement of the members 48 and 54 caused by spring 72, upon release of the brake actuating means.

Figure 9:
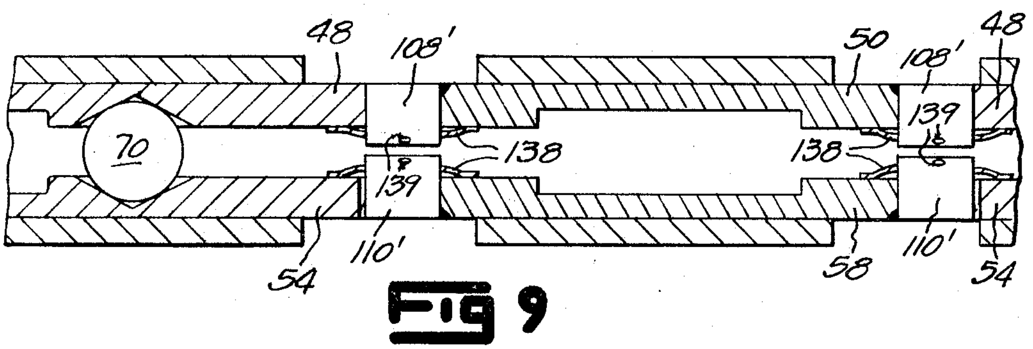
FIG. 9 is a fragmentary transverse sectional view taken on line 5—5 of FIG. 1 and illustrating a modified embodiment of the construction.
Figure 10:
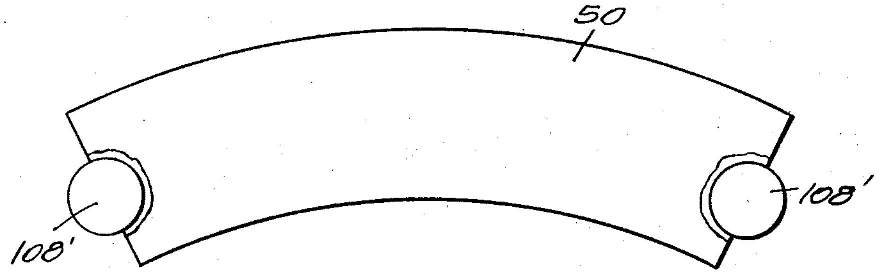
FIG. 10 is a face view of a segment of the brake disk assembly utilized in the FIG. 9 construction.

An alternative construction for interconnecting the segments with their respective braking members is illustrated in FIG. 9. In this construction the segments 50 and 58 carry pins 108' and 110' which project inwardly therefrom and which seat freely in notches in the associated braking members 48 and 54. The inner projecting ends of the pins 108' and 110' each mount spring washer 138 retained by pin projections 139. The spring washers 138 are of a diameter to abut the segment at one part thereof and the braking member at the opposite part thereof. Spring washers 138 serve to restore or maintain the segments in coplanar relation to the associated braking members and to accommodate limited axial movement of the segments relative to their associated braking members for operation of the brake, as explained above, and in a manner made clear by consideration of FIG. 9.

Figure 11:
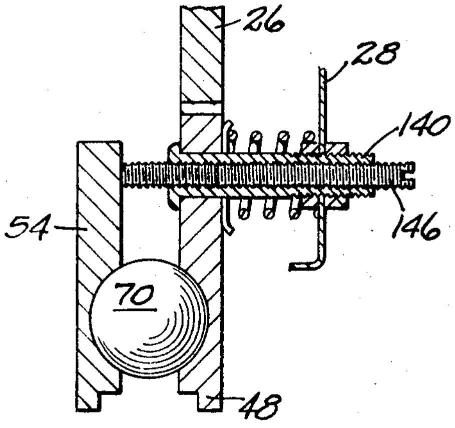
FIG. 11 is a fragmentary radial sectional view illustrating another modified construction of the device for adjusting the clearance of the brake lining from the brake drum.

Another form of brake lining clearance adjustor is shown in FIG. 11. In this construction, a tubular member 140 is screw-threaded internally and externally and passes through an opening in the member 48 and a registering opening in the dust shield 28. A screw member 146 is screw-threaded in the tube 140 and has rotatable connection with the opposed or outboard braking member 54. Screw member 146 has a slotted end which permits rotation thereof to accommodate variation of the spacing between the members 48 and 54.

Figure 12:
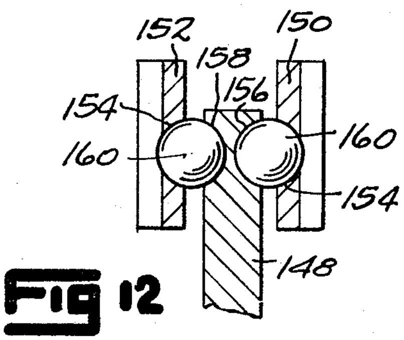
FIG. 12 is a fragmentary transverse sectional detail view illustrating another modification of the invention.

An alternative braking construction using two sets of balls to effect displacement of the braking members is illustrated in FIG. 12. In this construction a central part 148 is carried by a fixed member, such as the torque plate 26, and extends between the opposed braking disks or members 150 and 152. Both of the brake members or disks 150 and 152 are of the floating character, and the central part is interposed therebetween. At circumferentially spaced points, the opposite faces of the member 148 have circumferentially elongated cam recesses 154. The inner face of each brake member 150 and 152 has similarly circumferentially spaced cam recesses 156 and 158, respectively. It will be apparent that upon a movement of reaction portions or segments similar to the segments 50 and 58, previously described, to cause the same and the brake shoes to move circumferentially or rotatively to follow the rotation of the brake drum which they engage, there will occur a movement of the braking members 150 and 152 associated with the respective segments in a circumferential direction which will cause separation of the members 150 and 152 from the central part 148 by virtue of the movement or displacement of the cams 156 and 158 from the cam surfaces 154 of the central part by reason of the interposed balls or spheres 160 which seat in the respective recesses as shown.

Figure 13:
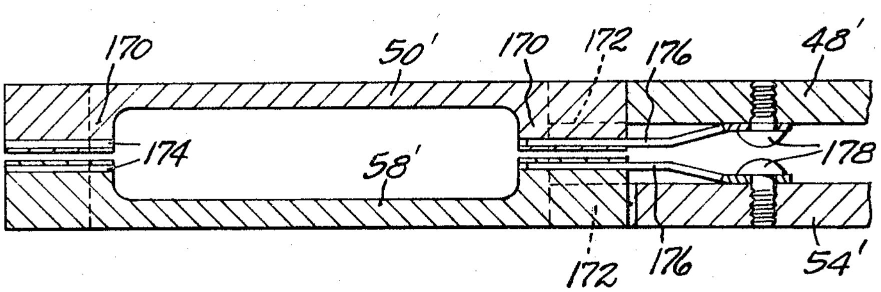
FIG. 13 is a fragmentary sectional view of another embodiment taken on line 5—5 of FIG. 1.

FIG. 13 illustrates a modified construction interconnecting the reaction segment with the braking member. In this construction each of the segments 50' and 58' has a thickened end portion 170 formed integrally therewith and having a reduced width integral tongue adapted to be straddled by a notched portion 172 at the adjacent end of the cooperating one of the brake members 40' and 54'. The end portions 170 have holes 174 therein extending circumferentially and adapted to slidably receive the end portions of elongated springs 176 which are fixed to the adjacent brake member at 178. This construction functions similarly to that shown in FIG. 5.

Figure 14:
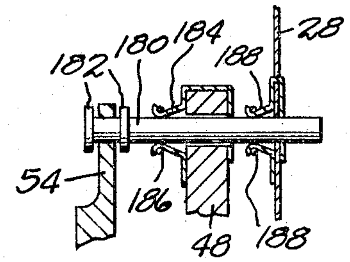
FIG. 14 is a fragmentary sectional view of another embodiment, taken on line 6—6 of FIG. 7.

FIG. 14 illustrates an alternative adjustor of slightly different construction than that shown in FIGS. 6 to 8. In this construction a pin 180 is slidable freely in apertures in member 48, dust shield 28 and member 54, there being spaced abutments 182 to limit the relative movement between pin 180 and member 54. Hooked end spring fingers 184 are carried by member 48 and extend in the direction of member 54 and into frictional contact with pin 180 as effected by resilient ring 186. Hooked end spring fingers 188 are carried by shield 28 and extend in the direction of member 48 and into frictional contact wth pin 180 as effected by resilient ring 188. This unit functions similarly to that shown in FIG. 6.

While the preferred embodiment of the invention has been illustrated and described, it will be understood that changes in the construction may be made within the scope of the appended claims without departing from the spirit of the invention.

I claim:

1. A disk brake comprising
a rotatable member to be braked,
a carrier for said rotatable member,
said rotatable member having spaced opposed friction surfaces,
first and second axially shiftable braking assemblies, between and normally clear of said surfaces,
each braking assembly including an interrupted annular member and a segmental reaction member positioned in the interruption of and shiftable axially relative to said annular member,
the annular member of one braking assembly being circumferentially shiftable relative to the segmental reaction member associated therewith and to the annular member of the other assembly,
an actuator disposed between and operable to shift said segmental reaction members axially,
means interposed between said annular members and responsive to relative circumferential shifting of said members for moving said annular members into engagement with said friction surfaces.

2. A disk brake as defined in claim 1, wherein
said last named means includes normally registering circumferentially spaced sets of cam recesses in said annular members,
each set of recesses receiving a ball therein, and spring means holding said annular members in engagement with said balls.

3. A disk brake as defined in claim 1, wherein
the members of each braking assembly interfit at the ends of said respective segmental reaction members, and
resilient means cooperate with the members of each braking assembly to normally position the segmental reaction member of each assembly in substantially the same plane as the associated annular member.

4. A disk brake as defined in claim 1, wherein
the adjacent ends of the members of each braking assembly interfit and one of said interfitting ends projects laterally and has a circumferential aperture therein, and
an elongated resilient member fitting in said aperture at one end portion and secured to the other member of said assembly at its opposite end portion.

5. A disk brake as defined in claim 1, and
means for limiting the axial movement of said annular members toward each other upon release of said actuator so as to limit the clearance of said members from said friction surfaces in the inoperative position of the device.

6. A disk brake as defined in claim 1, and
clearance control means including an axial member having a sliding engagement with opposed annular members, means limiting relative movement of said axial member and one annular member, and means carried by the other annular member and frictionally engaging said axial member.

7. A disk brake comprising a non-rotative member, a rotatable member to be braked having spaced opposed annular friction surfaces, first and second axially shiftable annular braking assemblies between and normally clear of said friction surfaces, each assembly including an interrupted member and a segmental reaction member interfitting with said interrupted member and shiftable axially thereof, the members of each assembly accommodating circumferential movement thereof, an actuator having a part extending between said reaction members and operable to urge said reaction members into engagement with said friction surfaces and thereby produce circumferential movement of said brake assemblies, and means interposed between said interrupted members of said braking assemblies and said non-rotative member and responsive to circumferential movement of said assemblies to move said interrupted members of said assemblies axially into engagement with said friction surfaces.

8. A disk brake as defined in claim 7, wherein said actuator includes a lever pivoted to one reaction member and fulcrumed on the other reaction member and means for pivoting said lever.

References Cited

UNITED STATES PATENTS

| | | | |
|---|---|---|---|
| 2,256,725 | 9/1941 | Pierce et al. | 188—72 |
| 2,384,297 | 9/1945 | Goepfrich | 188—196 |
| 3,185,257 | 5/1965 | Caero | 188—72 |
| 3,194,350 | 7/1965 | Soltis | 188—196 |

FOREIGN PATENTS

| | | |
|---|---|---|
| 200,718 | 1/1956 | Australia. |

MILTON BUCHLER, *Primary Examiner.*

G. E. A. HALVOSA, *Assistant Examiner.*